(12) United States Patent
Wu

(10) Patent No.: US 6,219,857 B1
(45) Date of Patent: Apr. 24, 2001

(54) SENSOR DEVICE FOR USE WITH A FLUSH VALVE

(75) Inventor: Shui-Shun Wu, Nan-Tou Hsien (TW)

(73) Assignee: Hydrotek Corporation, Nan-Tou (TW)

( * ) Notice: Subject to any disclaimer, the term of this patent is extended or adjusted under 35 U.S.C. 154(b) by 0 days.

(21) Appl. No.: 09/464,413

(22) Filed: Dec. 16, 1999

(51) Int. Cl.[7] .............................. E03D 5/10; E03D 13/00
(52) U.S. Cl. ..................... 4/623; 4/304; 4/313; 4/668; 250/338.1; 250/347; 250/353
(58) Field of Search ..................... 4/623, 302, 304, 4/305, 313, 668; 250/522.1, 347, 338.1, 353, 221, 224

(56) References Cited

U.S. PATENT DOCUMENTS

| | | | |
|---|---|---|---|
| 3,864,567 | * | 2/1975 | Bez ..................... 250/338.1 |
| 4,672,206 | * | 6/1987 | Suzuki et al. ............ 250/347 |
| 4,795,908 | * | 1/1989 | Morimoto et al. ......... 250/353 |
| 5,025,516 | * | 6/1991 | Wilson ..................... 4/623 |
| 5,548,119 | * | 8/1996 | Nortier ..................... 4/623 |
| 5,586,746 | * | 12/1996 | Humpert et al. ............. 4/623 |
| 5,780,854 | * | 7/1998 | Lin ....................... 250/347 |
| 5,901,384 | * | 5/1999 | Sim ......................... 4/302 |
| 5,950,983 | * | 9/1999 | Jahrling .................... 4/313 |

* cited by examiner

Primary Examiner—Charles R. Eloshway
(74) Attorney, Agent, or Firm—Foley & Lardner

(57) ABSTRACT

A sensor device includes a mounting frame having open front and rear ends, and right and left inner side walls opposite to each other in a longitudinal direction and extending between the front and rear ends so as to define a passage. The mounting frame is adapted to be mounted such that the body of a user of the sanitary apparatus will be sighted by the passage. A sensor body is inserted into the passage, and has a front side proximate to the front end to emit and receive a light signal, and right and left lateral walls that face respectively and spacedly the right and left inner side walls. A pair of pivotally mounting members are respectively disposed between the right lateral and inner side walls, and between the left lateral and inner side walls such that the pivotally mounting members effect pivotal mountings which are pivotable between angular positions about an axis parallel to the longitudinal direction. A retaining member is disposed between the sensor body and the mounting frame to frictionally retain the sensor body in a selected one of the angular positions.

6 Claims, 6 Drawing Sheets

SENSOR DEVICE FOR USE WITH A FLUSH VALVE

BACKGROUND OF THE INVENTION

1. Field of the Invention

This invention relates to a sensor device, more particularly to a sensor device for use with a flush valve which controls outflow of the water to a sanitary apparatus.

2. Description of the Related Art

Referring to FIG. 1, a conventional sensor device (1a) is shown to be mounted on a sanitary apparatus, such as a urinal 2, to actuate a solenoid valve (1b) of a flush valve 1 for controlling outflow of the water to the urinal 2. Since the sensor device (1a) is secured on the urinal 2, the angular position of the light emitted from the sensor device (1a) is fixed. As such, the conventional sensor device (1a) is not suitable for mounting on other kinds of the sanitary apparatus.

SUMMARY OF THE INVENTION

The object of the present invention is to provide a sensor device which permits ease of adjustment of the angular position of the emitted light so as to be suitable for mounting on any kind of the sanitary apparatus.

According to this invention, the sensor device includes a mounting frame having open front and rear ends opposite to each other in a transverse direction, and right and left inner side walls spaced apart from each other in a first longitudinal direction and extending in the transverse direction between the first front and rear ends so as to define a passage. The mounting frame is adapted to be mounted such that the body of a user of the sanitary apparatus will be sighted by the passage. A sensor body has a front side to emit and receive a light signal, and right and left lateral walls disposed opposite to each other in a second longitudinal direction. The sensor body is disposed to be insertable into the passage such that the front side is proximate to the open front end and faces towards the transverse direction, and such that the right and left lateral walls face respectively and spacedly the right and left inner side walls with the first and second longitudinal directions aligned with each other. A pair of pivotally mounting members are respectively disposed between the right lateral and inner side walls, and between the left lateral and inner side walls. When the sensor body is inserted into the passage, the pivotally mounting members effect pivotal mountings therebetween, which are pivotable between angular positions about an axis parallel to the first longitudinal direction, and which are detachable in the transverse direction. A retaining member is disposed between the sensor body and the mounting frame to frictionally retain the sensor body in a selected one of the angular positions

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
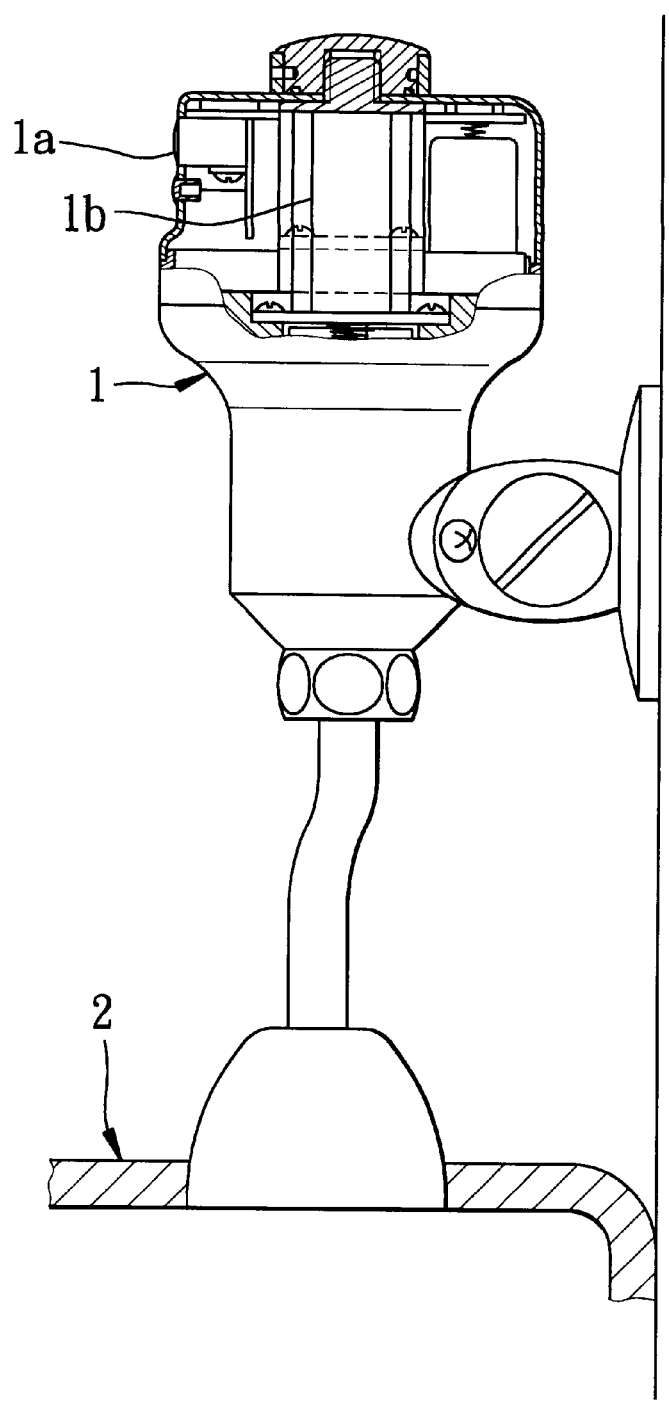
FIG. 1 is a schematic view of a conventional sensor device mounted on a urinal.
Figure 2:
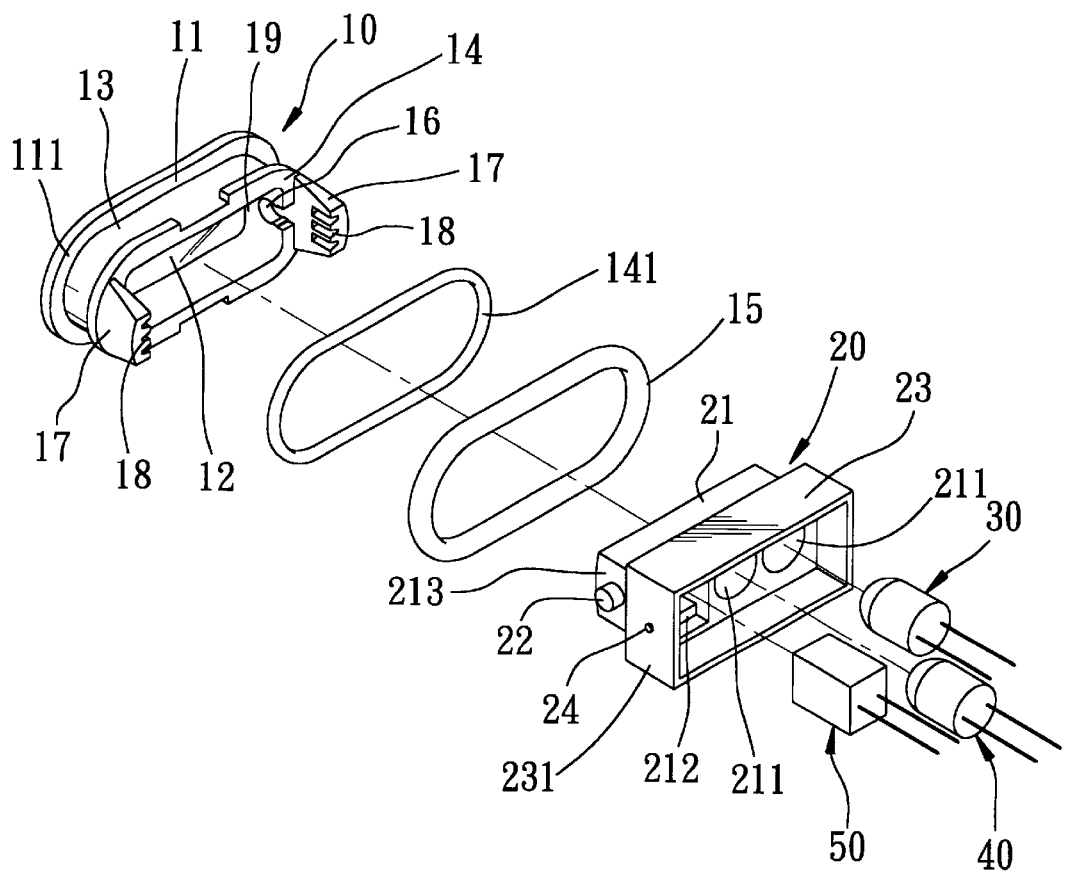
FIG. 2 is an exploded perspective view of a preferred embodiment of a sensor device according to this invention.
Figure 3:
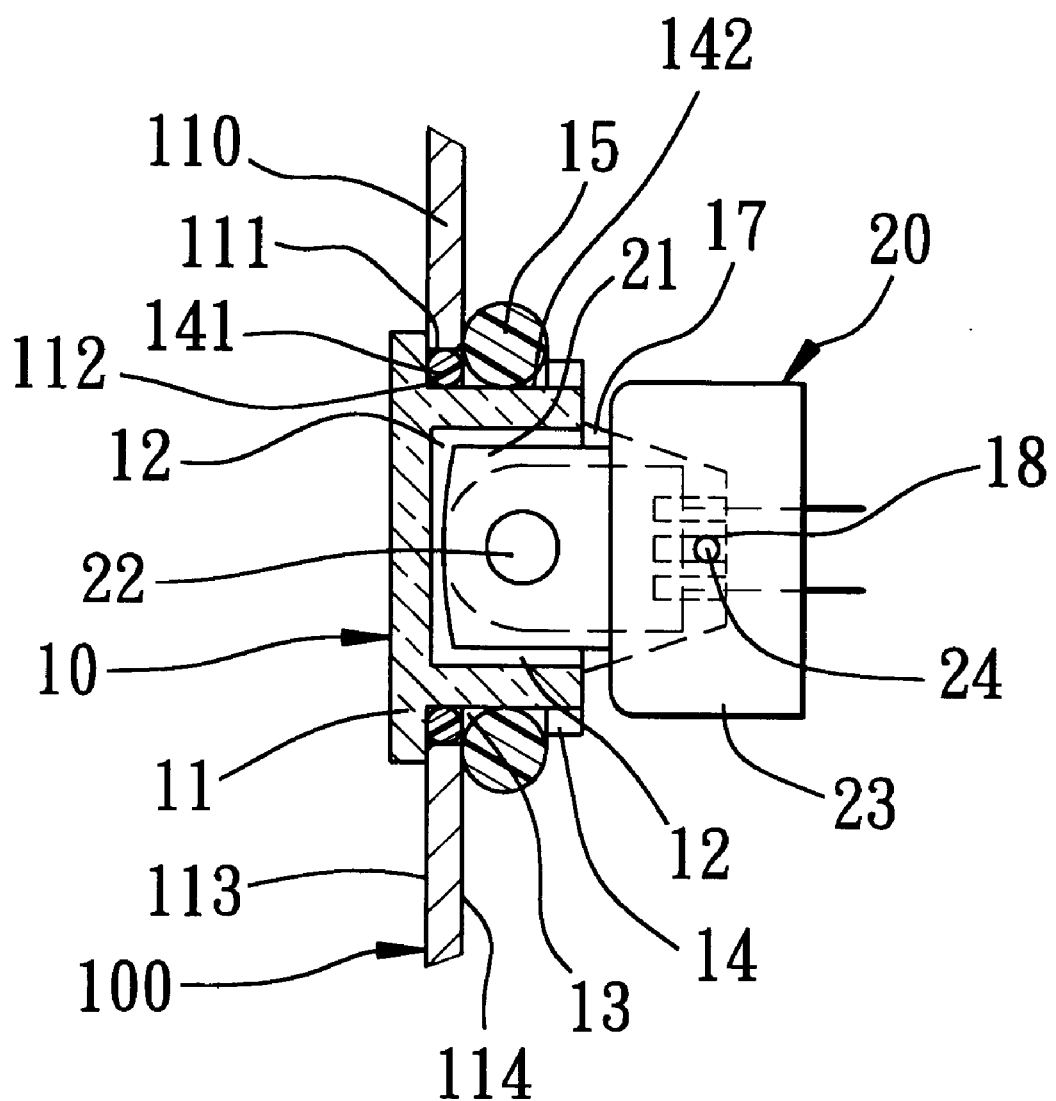
FIG. 3 is a sectional view of the preferred embodiment of the sensor device mounted on a wall of a sanitary apparatus.
Figure 6:
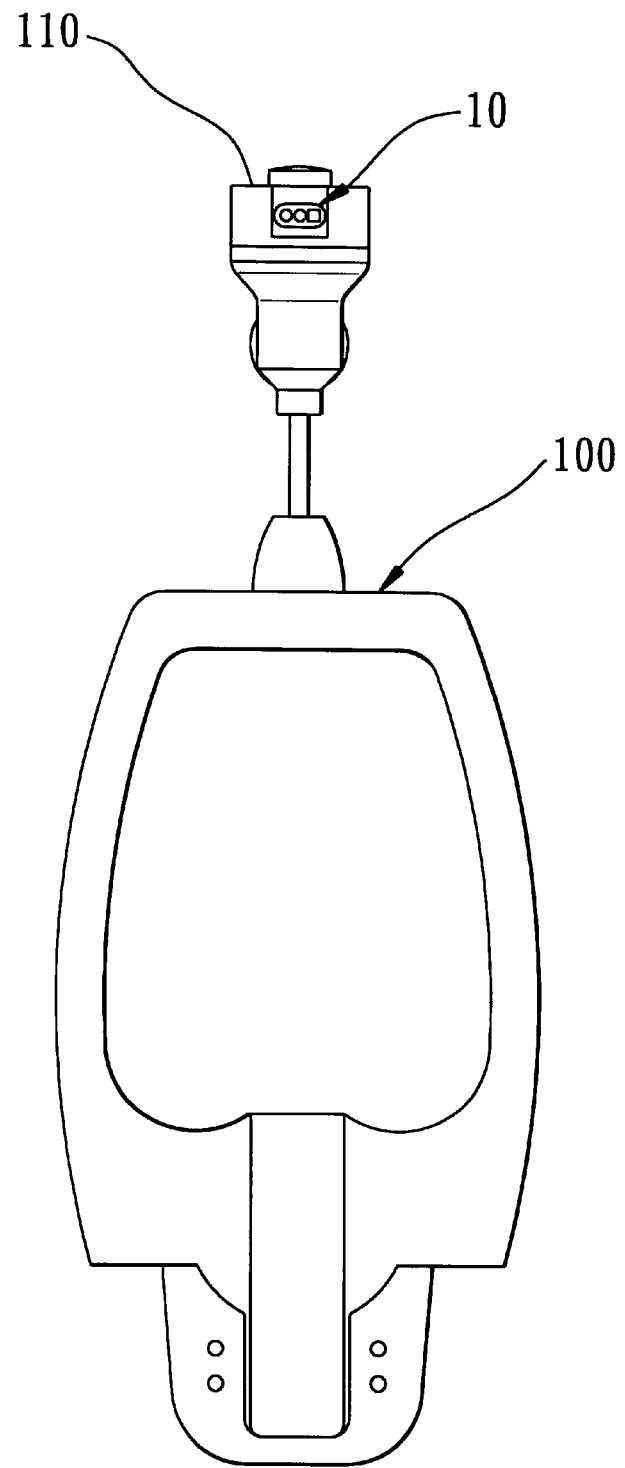
FIG. 6 is a schematic view of the sensor device mounted on a urinal.

As shown in FIG. 6, the preferred embodiment of the sensor device according to the present invention is shown to be mounted on a sanitary apparatus 100, such as a urinal. Referring to FIGS. 2 and 3, the sensor device is shown to comprise a mounting frame 10 and a sensor body.

The mounting frame 10 has an open front end which is provided with a transparent plate 11, and an open rear end which is disposed opposite to the front end in a transverse direction, and includes a circumferential wall 13 which is disposed between the front and rear ends. The circumferential wall 13 is provided with right and left inner side walls 19 spaced apart from each other in a first longitudinal direction so as to define a passage 12. The passage 12 is mounted such that the body of a user of the sanitary apparatus 100 will be sighted by the passage 12. Two engaging notches 16 are formed respectively in the right and left inner side walls 19, and are aligned with each other in the first longitudinal direction. The transparent plate 11 has a front flange 111 extending outwardly of the circumferential wall 13 to form a front shoulder 112. A rear flange 14 is disposed to extend radially and outwardly of the circumferential wall 13 proximate to the rear end to form a rear shoulder 142. The mounting frame 10 further includes right and left frame walls 17 which extend respectively and rearwardly of the right and left inner side walls 19. Two sets of grooves 18 are formed in the right and left frame walls 17, and are aligned with each other in the first longitudinal direction. The grooves 18 of each set are arranged in a direction transverse to both the transverse and first longitudinal directions so as to confine a plurality of angular positions.

The sensor body is received in the passage 12, and includes a sensor casing 20 and a sensor unit. The sensor casing 20 includes a front casing portion 21 and a rear casing portion 23. The front casing portion 21 is provided with right and left lateral walls 213 which are disposed opposite to each other in a second longitudinal direction. The rear casing portion 23 is provided with right and left rear walls 231 which extend respectively and rearwardly of the right and left lateral walls 213 and which are disposed opposite to each other in the second longitudinal direction such that the right and left lateral walls 213 face respectively and spacedly the right and left inner side walls 19, and such that the right and left rear walls 231 face respectively and spacedly the right and left frame walls 17 with the first and second longitudinal directions aligned with each other. Two pins 22 extend respectively and outwardly of the right and left lateral walls 213, and are disposed opposite to each other in the second longitudinal direction to be inserted rotatably into the engaging notches 16 about an axis parallel to the first longitudinal direction, and to be disposed detachably from the engaging notches 16 in the transverse direction. Two protrusions 24 are disposed respectively on the right and left rear walls 231 to engage respectively selected ones of the grooves 18 so as to retain frictionally the sensor casing 20 in a selected one of the angular positions. Two circular holes 211 and a rectangular hole 212 are formed in the sensor casing 20 for receiving securely a light emitting unit 30, a light receiving unit 40, and a sensor indicating unit 50 of the sensor unit, respectively. The sensor unit has a front side which is proximate to the open front end of the mounting frame 10 and which faces towards the transverse direction to emit and receive a light signal.

Two elastomeric friction rings 141,15 surround the circumferential wall 13. As such, when the sensor device is mounted on a casing wall 110 of a sanitary apparatus 100 and is inserted into an opening 111 of the casing wall 110, the friction ring 141 is retained in the opening 111, and the front shoulder 112 and the friction ring 15 abut respectively against an outer side 113 and an inner side 114 of the wall 110 for preventing from removal of the sensor device from the sanitary apparatus 100 in the transverse direction.

Figure 4:
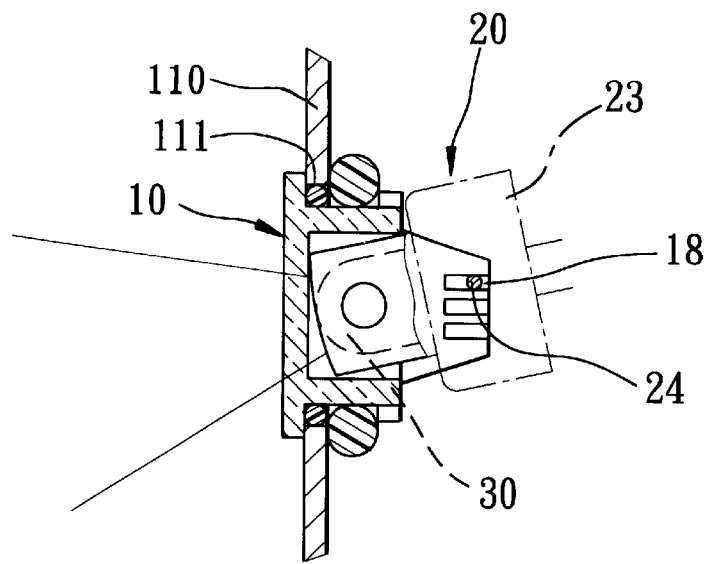
FIGS. 4 and 5 are sectional views of the preferred embodiment of the sensor device in different angular states.
Figure 5:
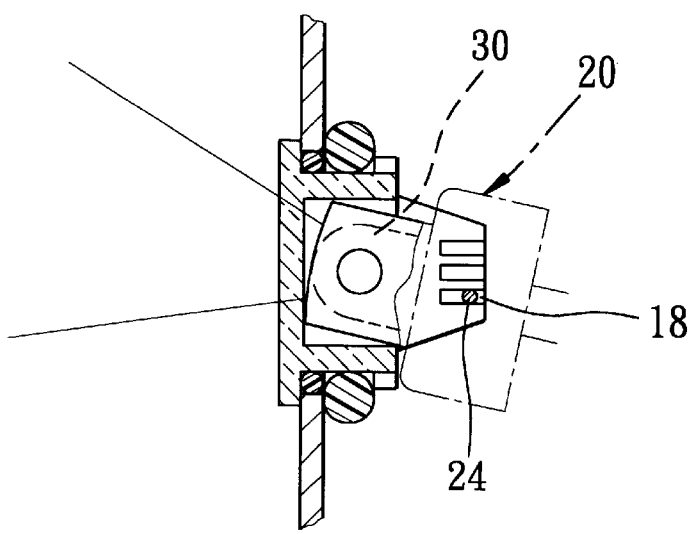
Figure 7:
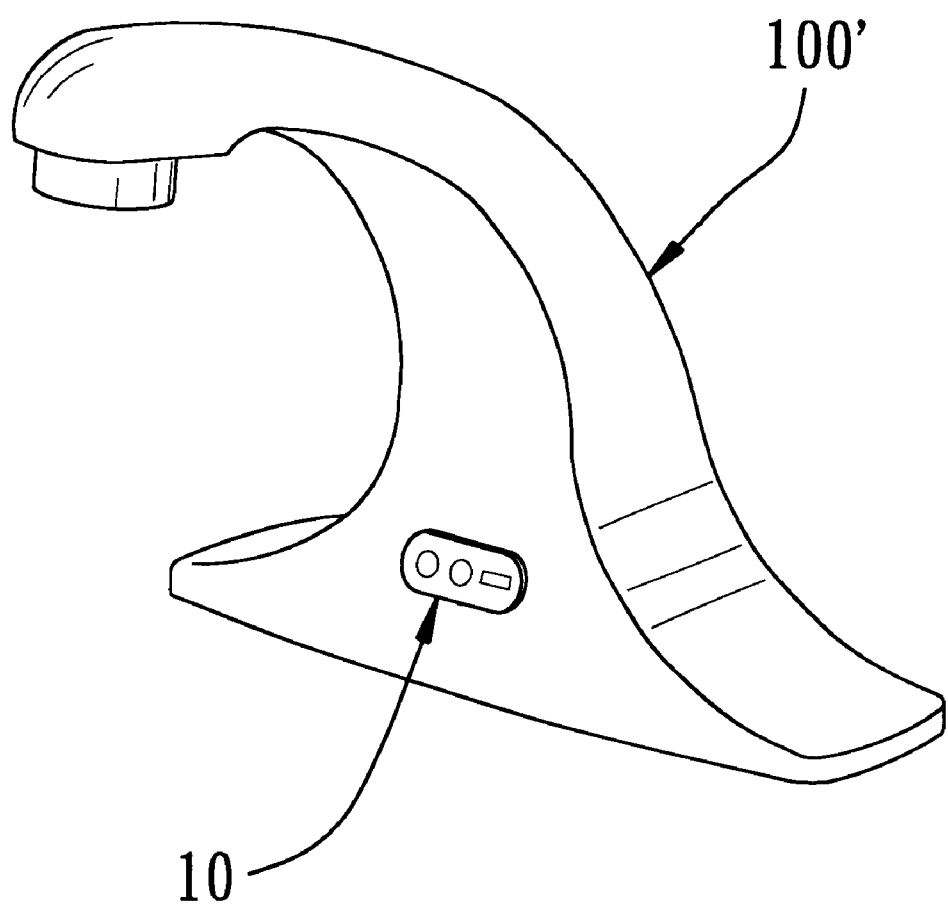
FIG. 7 is a perspective view of the sensor device mounted on a faucet.

As such, referring to FIGS. 4 and 5, with the pivotal mountings between the engaging notches 16 and the pins 22, the sensor casing 20 can be rotated downwardly to orient the light emitted from the light emitting unit 30 downward, and is retained at an upper one of the angular positions. Similarly, the sensor casing 20 can be rotated upwardly to orient the light upward, and is retained at a lower one of the angular positions. Accordingly, the sensor device of this invention can be mounted on any kind of the sanitary apparatus, such as the urinal and a faucet 100' (as shown in FIG. 7), and permits ease of adjustment of the angular position of the sensor body relative to the mounting frame 10.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A sensor device for use with a flush valve which controls outflow of the water to a sanitary apparatus, said sensor device comprising:

a mounting frame having open front and rear ends opposite to each other in a transverse direction, and including right and left inner side walls spaced apart from each other in a first longitudinal direction and extending in the transverse direction between said front and rear ends so as to define a passage, said mounting frame being adapted to be mounted such that the body of a user of the sanitary apparatus will be sighted by said passage;

a sensor body having a front side to emit and receive a light signal, and including right and left lateral walls disposed opposite to each other in a second longitudinal direction, said sensor body being disposed to be insertable into said passage such that said front side is proximate to said open front end and faces towards the transverse direction, and such that said right and left lateral walls face respectively and spacedly said right and left inner side walls with the first and second longitudinal directions aligned with each other;

a pair of pivotally mounting members respectively disposed between said right lateral and inner side walls, and between said left lateral and inner side walls, and such that when said sensor body is inserted into said passage, said pivotally mounting members effect pivotal mountings therebetween, which are pivotable between angular positions about an axis parallel to the first longitudinal direction, and which are detachable in the transverse direction; and a retaining member disposed between said sensor body and said mounting frame to frictionally retain said sensor body in a selected one of said angular positions.

2. The sensor device as claimed in claim 1, wherein said pivotally mounting members include two engaging notches formed respectively in said right and left inner side walls, and disposed opposite to each other in the first longitudinal direction, and two pins extending respectively and outwardly of said right and left lateral walls and disposed opposite to each other in the second longitudinal direction to be inserted rotatably into said engaging notches about the axis when said sensor body is inserted into said passage.

3. The sensor device as claimed in claim 1, wherein said sensor body includes a sensor casing received in said passage and provided with said right and left lateral walls, and a sensor unit secured in said sensor casing.

4. The sensor device as claimed in claim 3, wherein said sensor body is provided with right and left rear walls extending respectively and rearwardly of said right and left lateral walls, said mounting frame being provided with right and left frame walls extending respectively and rearwardly of said right and left inner walls, said retaining member including a plurality of grooves formed in one of said right and left frame walls and arranged to correspond to said angular positions, and a protrusion disposed on one of said right and left rear walls to engage a selected one of said grooves so as to retain said sensor body in the selected one of said angular positions.

5. The sensor device as claimed in claim 1, further comprising a transparent plate mounted on said open front end of said mounting frame for passage of light emitted from said sensor body.

6. The sensor device as claimed in claim 1, wherein said mounting frame further includes a circumferential wall disposed between said open front and rear ends and provided with said right and left inner side walls, front and rear flanges extending radially and outwardly of said circumferential wall and disposed respectively proximate to said open front and rear ends to form respectively front and rear shoulders, and an elastomeric friction ring surrounding said circumferential wall between said front and rear shoulders, said sensor device being adapted to be mounted on a wall of the sanitary apparatus which has inner and outer side walls opposite to each other in the transverse direction such that said front shoulder abut against the outer wall and said friction ring abut against the inner wall for preventing from removal of said sensor device from the sanitary apparatus in the transverse direction.

* * * * *